Feb. 8, 1966 R. A. SOMERS ETAL 3,234,417
LOW VOLTAGE D.C. MOTOR
Filed Nov. 24, 1961
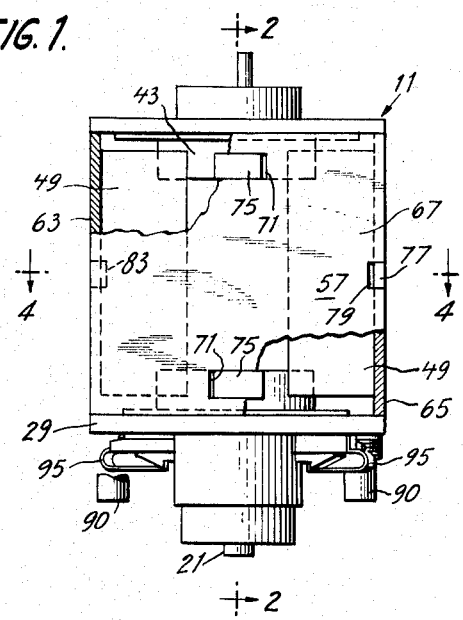
FIG. 1.
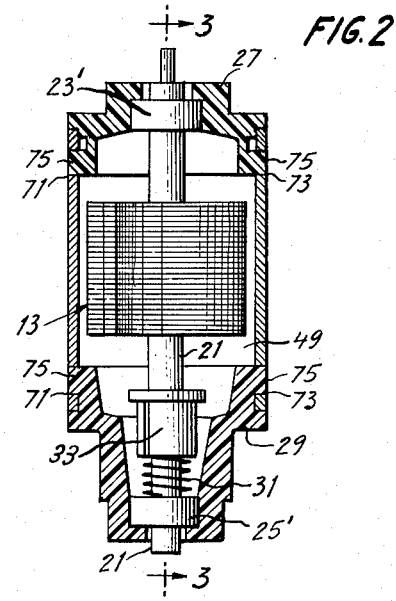
FIG. 2.
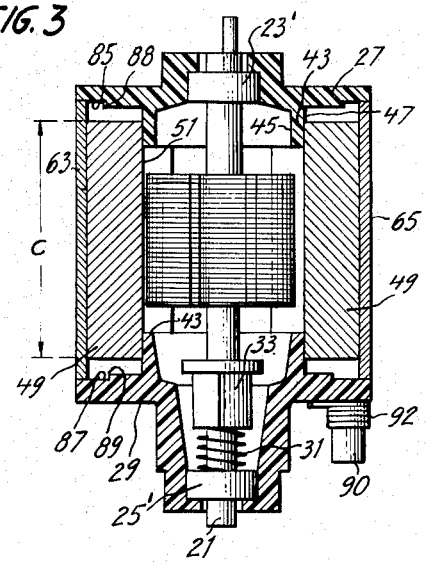
FIG. 3.
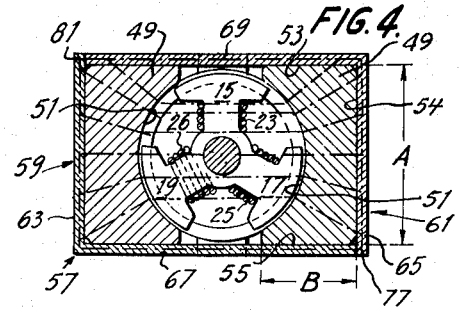
FIG. 4.
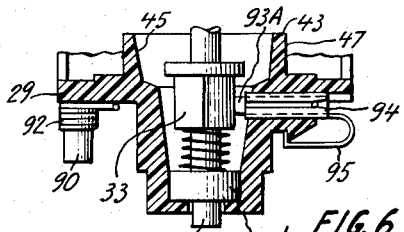
FIG. 6.
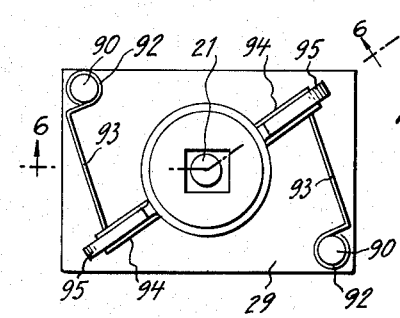
FIG. 5.
FIG. 7.
INVENTORS.
RAYMOND A. SOMERS
ROBERT J. TOLMIE
BY
C. N. Miranda
ATTORNEY United States Patent Office 3,234,417
Patented Feb. 8, 1966

3,234,417
LOW VOLTAGE D.C. MOTOR
Raymond A. Somers, Fairfield, and Robert J. Tolmie, Bridgeport, Conn., assignors to Sperry Rand Corporation, New York, N.Y., a corporation of Delaware
Filed Nov. 24, 1961, Ser. No. 154,579
20 Claims. (Cl. 310—154)

The present invention relates to electrical motors and more particularly to low voltage D.C. motors.

Many types of equipment demand low voltage D.C. motors that are rugged and reliable so that a minimum is expended in time and expense to maintain the motors in proper operating condition. Some equipment requires, in addition, a compact motor but at no sacrifice in output. The foregoing requirements determined to a large extent the cost of the motors and ultimately the price to the user of the equipment incorporating the motors. In certain equipment which may be categorized as consumer products, such as electrical appliances, the price of the motor as viewed by the producer of the equipment becomes a primary consideration. In other equipment where the motor comprises but one component of many and the cost thereof is little in comparison with the remainder of the equipment, price of the motor may not be of primary importance but yet is of consideration in determining purchase, all other things being equal. Manufacturers of electrical motors constantly strive to meet the above requirements but generally are confronted with the usual problem of providing a motor which is attractive to the purchaser from the standpoint of price. Ruggedness and reliability of the motor often times dictate a motor design which is costly to manufacture viewed from the standpoint of complexity of motor construction and/or expensive manufacturing steps and involved assembly techniques.

In the manufacture and assembly of low voltage D.C. motors which employ a permanent stator magnet or magnets substantially surrounding a rotatable armature, the use of accurately ground magnets is required and the magnets must be assembled to precision made structure to maintain proper gap tolerances between the rotor and the stator magnet or magnets, and between the yoke and the stator magnet. Of necessity, this requires numerous manufacturing steps both as regards the elements themselves and the assembly of such elements to form the motor. In addition, when a compact motor is desired the same may not be completely achieved inasmuch as the magnetic yoke must be sufficiently spaced from the magnets to reduce short-circuiting of magnetic flux through the yoke.

An object of the present invention is to provide a low voltage D.C. motor of novel construction.

Another object is to provide a novel low voltage D.C. motor wherein simplified assembly techniques are employed in the manufacture of the motor.

Still another object is to provide a low voltage D.C. motor which employs permanent stator magnets quickly assembled in close air gap tolerances with respect to the rotor.

A further object is to provide a low voltage D.C. motor wherein a magnetic return yoke or frame is employed with the stator magnets and serves as a support for end bell structure without the requirement of any threaded fastening means to maintain the rotor and stator in completely assembled relationship.

A still further object is to provide a novel low voltage D.C. motor which employs an adjustable yoke or frame to accommodate unground stator magnets of varying dimensions.

Another object is to provide a low voltage D.C. motor which employs a magnetic yoke in contact with the stator magnets and maximum flux density characteristics of the magnets are still maintained to effect a compact motor.

Still another object is to provide a low voltage D.C. motor which is highly efficient, inexpensive, rugged, reliable, compact and consists of a minimum number of parts.

The present invention therefore contemplates a low voltage D.C. motor which comprises a pair of spaced permanent stator magnets magnetized in a radial direction and having a rotor with windings disposed for rotation between the magnets. The shaft of the rotor is mounted for rotation in a pair of end bells or supports and the latter includes spacer means which engage the arcuate surface of each magnet to maintain a predetermined air gap between the arcuate surface of the magnet and the pole face of the rotor. A magnetic return yoke or frame embraces the stator magnets and is adjustable to accommodate unground magnets of varying dimensions. The frame serves to support the end bells, and in conjunction therewith, forms a housing or casing of box-like configuration in which the frame has limited movement in directions varying the transverse cross sectional area of the housing.

The above and other objects and advantages of the present invention will appear more fully hereinafter from a consideration of the detailed description which follows, taken together with the accompanying drawing wherein an embodiment of the invention is illustrated.

In the drawing wherein like reference characters refer to like parts throughout the several views:

FIG. 1 is an elevational view, partly broken away, of a motor embodying the present invention;

FIG. 2 is a sectional view taken along the line 2—2 of FIG. 1;

FIG. 3 is a sectional view taken along the line 3—3 of FIG. 2, and more clearly shows the positional relationship of the rotor and the permanent magnets;

FIG. 4 is a transverse sectional view taken along the line 4—4 of FIG. 1;

FIG. 5 is a view looking at the underside of the motor as seen in FIG. 1;

FIG. 6 is a fragmentary view taken along the line 6—6 of FIG. 5 and shows in part commutator and brush arrangement of the motor; and FIG. 7 is a partly sectional view showing the commutator structure.

Referring now to the drawing and particularly to FIGS. 1 and 2 hereof for a more detailed description of the present invention, the reference character 11 generally designates a motor which comprises a rotor or armature 13 having laminated armature segments 15, 17 and 19 (FIG. 4) symmetrically disposed about motor output or armature shaft 21. Separate windings 23, 25 and 26 (shown only in FIG. 4) are provided for armature segments 15, 17 and 19, respectively. The opposite ends of shaft 21 are provided with bearing means 23' and 25' which are seated in end bells 27 and 29 respectively, the end bells being formed of non-magnetic material as for example, a plastic. A coil spring 31 is disposed about shaft 21 and has one end in engagement with bearing member 25' and its other end in contact with a commutator 33 to urge the shaft in an upward direction (as seen in FIG. 2) and against end bell 27. Commutator 33 consists of three split conducting segments 35, 37 and 39 (FIG. 7) which are electrically connected to windings 23, 25 and 26. The commutator segments are disposed on an insert 41 of insulating material as for example, Bakelite, which is in turn press-fitted to shaft 21.

End bells 27 and 29 are each provided with a projecting portion or annulus 43, preferably formed integral with the end bells, disposed in concentric relationship with armature shaft 21. Each of the annuli 43 is provided with an inner surface 45 and an outer surface 47, the latter extending radially beyond the armature segments for a predetermined distance.

Motor 11 includes a pair of elongated permanent stator magnets 49 which are substantially rectangular in transverse cross-section except for one side 51 thereof which is substantially arcuate shaped. The remaining longitudinally extending surfaces of magnet 49 designated as 53, 54 and 55 (FIG. 4) are flat or planar. Magnets 49 are formed of a suitable material having high magnetic retentive properties as for example Barium Ferrite and are produced by a sintering or molding operation. A magnetic return yoke 57 formed of suitable magnetic material is provided in contact with flat surfaces 53, 54 and 55 of both magnets 49. Frame 57 is substantially rectangular in transverse cross-section and comprises separable L-shaped sections 59 and 61 having foot portions 63 and 65 FIG. 4) and leg portions 67 and 69 respectively. Upper and lower apertures 71 and upper and lower apertures 73 are provided in legs 67 and 69 respectively, and are shaped to accommodate therein radially extending lugs 75 formed on the upper and lower annuli 43. The horizontal dimensions of apertures 71 and 73 as seen in the drawing are greater than the horizontal dimensions of lugs 75 to permit lateral movement of the frame sections 59 and 61 while the vertical dimensions of the apertures and of the lugs are substantially the same to restrain movement of sections 59 and 61 in directions normal to end bells 27 and 29. Foot 65 of frame section 61 is provided with a tab 77 (FIGS. 1 and 4) which is accommodated within a slot 79 formed in leg 67 of frame section 59 while a tab 81 is formed on leg 63 and accommodated within a slot 83 formed in leg 69 of frame section 61. The slots 79 and 83 are open along the edges of the respective legs 67 and 69 to permit movement of the tabs into and out of the slots.

Circular recesses 85 and 87 are formed in end bells 27 and 29 respectively to seat the upper and lower edges of frame 57 therein. Circumferential shoulders 88 and 89 are provided on end bells 27 and 29 respectively and are disposed inwardly of these recesses 85 and 87. Lower end bell 29 has formed thereon a pair of diametrically opposed depending posts 90 (FIG. 5) each of which accommodates a coiled brush retaining spring 92. One end 93 of each spring 92 is straight and extends along the external surface of end bell 29 to engage a commutator brush 93A disposed in a brush holder 94 formed integral with end bell 29. Brush holder 94 is split longitudinally thereof (FIG. 6) to permit entry of end 93 of spring 92 in engagement with brush 93A to maintain the latter in contact with commutator 33. Substantially U-shaped flat spring terminals 95 each have arm portions extending into brush holder 94 and below and in engagement with brush 93A (FIG. 6) and constitute an input terminal for electrically connecting motor 11 with a source of direct current energy.

One of the critical factors in the design and manufacture of motors is the maintenance of a predetermined air gap between the rotor and the stator. Generally, it is desired to provide an air gap of minimum dimension in order to reduce the reluctance factor in the magnetic circuit to the smallest value possible. It may well be appreciated that this situation inherently poses no small problem in the manufacture of the motors inasmuch as the parts constituting the rotor and the stator and their companion structure must be made within exceedingly close tolerance. The foregoing requires expensive manufacturing steps in machining or grinding the different parts to the required dimensions in order to maintain a minimum air gap. In addition, complex assembly fixtures and testing procedures must be employed to assemble the precision parts and to assure proper positional arrangement of the various elements, particularly those of the rotor and the stator.

Low voltage D.C. motors have been proposed which employ a molded permanent stator magnet in the shape of a cylinder, and a magnetic return yoke of similar shape engaging the outer surface of the magnet. A problem confronting the manufacturers of motors employing molded cylindrical stator magnets is that as a result of the molding process often times the radial thickness of the magnet will vary so that extensive machining steps are required to grind the surfaces of the magnet to the designed dimensions. Moreover, the yoke must be precision ground to the dimensions of the magnet and in addition, accurately dimensioned structure must be provided in the motor to restrain movement of the yoke with respect to the magnet.

As indicated previously, magnets 49 of the present invention are molded and such magnets also may be produced with dimensions which depart from the design dimensions. For example, in the molding of the magnets 49 it may be found that dimensions designated as A, B, and C (FIGS. 3 and 4) may vary and if it were necessary to contain the magnets within a fixed yoke or frame, extensive and expensive grinding operations would be required. However, the present invention avoids machining operations on the magnets by providing the adjustable yoke or frame 57 which accommodates magnets having variations in dimensions A, B, and C. Any variations in the dimensions A and B merely entails movement of the separable frame sections 59 and 61 in directions reducing or increasing the transverse cross-sectional area defined by the frame sections, the extent of movement of the frame sections being limited by the horizontal dimensions of the apertures 71 and 73, slots 79 and 83, and shoulders 88 and 89. Moreover, variations in dimension C, or the height of the magnet as seen in FIG. 3, are provided for by dimensioning the height of the frame 57 slightly in excess of what normally may be expected in dimension C of the magnets, whereby a compensatory space exists between the inner surfaces of end bells 27 and 29 and the top and bottom of magnets 49 (looking at FIG. 3). The construction of the present invention should not be considered only from the standpoint of accommodating magnets having irregular dimensions but should be considered additionally as accommodating magnets of varying sizes and of configuration similar to magnets 49. As long as such different size magnets, fall within the limits determined by apertures 71 and 73 and slots 79 and 83 they will be usable with the subject construction.

It should be noted that regardless of variations in the dimensions A, B and C of magnets 49 a predetermined air gap always will be maintained between armature 13 and magnets 49 by the structure of the present invention. If FIG. 3 of the drawing is considered for example, it will be seen that the outer surface 47 of annuli 43 engages the inner arcuate surfaces 51 of magnets 49. Since annuli 43 are fixed with respect to end bells 27 and 29 and thus to the axis of shaft 21, the radial distance of the outer surface 47 from the center of the end bells 27 and 29 will determine the dimension of the air gap between armature 13 and magnets 49. In the assembly of the motor of the present invention, frame sections 59 and 61 are pushed together until the arcuate sides 51 of magnets 49 engage the outer surface 47 of annuli 43 so that in every instance magnets 49 are spaced a predetermined distance from the armature when the motor 11 is fully assembled. In addition it should be noted that non-arcuate longitudinal sides of the magnets are in engagement with the frame sections.

Another novel feature of the present invention is that the construction of motor 11 provides for the yoke or frame 57 to be brought into contact with the permanent magnets 49 without causing any loss in flux by reason of such contact. This is accomplished by magnetizing permanent magnets 49 in such a manner that the magnetic lines of force and the flux therein pass radially through the magnets, as graphically shown by the broken lines in FIG. 4. The flux internally of the magnet extends normal to the arcuate face 51 and passes across the air gap, through frame 57, thus completing the path for the magnetic circuit. This is contradistinction to permanent magnets which are magnetized in a longitudinal direction whereby the lines of force pass other than normal to the face of the rotor, or, if the construction of FIG. 4 is considered the lines of force would extend parallel to legs 67 and 69. It is apparent to those skilled in the art that if the structure of FIG. 4 utilized longitudinal magnetization the portions of the magnets 49 adjacent to and in contact with the legs 67 and 69 of frame 57 would be rendered substantially ineffective to maintain such flux intensity inasmuch as the flux passing through such portions of magnets 49 would be short-circuited to the frame without passing through the windings. Consequently, the radial magnetization of magnets 49 provides for a more compact motor inasmuch as a motor embodying magnets longitudinally magnetized would require spacing of the yoke from the magnets to eliminate the short-circuiting problem, whereby the overall size of the motor would have to be increased to provide for such spacing. On the other hand, the motor of the present invention could employ magnets longitudinally magnetized although it is readily apparent that this would result in a reduction in flux. One of the more important advantages of the present invention is the novel construction of the motor 11 which permits assembly and disassembly thereof with an absolute minimum of time and effort. For example, except for assembly of armature 13, all of the elements of the motor may be assembled by hand. Thus, in the assembly of the motor the opposite ends of shaft 21 are mounted in end bells 27 and 29. Magnets 49 next are placed between the end bells with the arcuate faces 51 in proximity to the annuli 43. One of the sections of frame 57 then is inserted between the end bells and positioned so that lugs 75 enter the apertures in the leg portion of said section. Similarly, the second section of frame 57 is assembled with the tabs and slots of the frame sections in registry. Finally, both sections 59 and 61 may be grasped in one hand and pressed together whereby the magnets 49 will be in proper assembled relationship with the armature 13 and frame 57 in contact with the magnets and seated on the end bells. Disassembly of motor 11 may be accomplished just as simply by proceeding in reverse of the order of steps taken in assembly of the motor.

The adjustable yoke or frame 57 has been illustrated and described as having two separable sections but it should be understood that it is well within the contemplation of the present invention for the frame to consist of more than two sections as long as they function in a manner to achieve the desired results disclosed herein.

Although one embodiment of the present invention has been illustrated and described in detail, it is to be expressly understood that the invention is not limited thereto. Changes can be made in the design and arrangement of the parts without departing from the spirit and scope of the invention as the same will now be understood by those skilled in the art.

What is claimed is:

1. In an electric motor of the class described, a rotatable armature including a shaft, means for mounting said shaft for rotation, a pair of permanent magnets supported in parallel relationship with said armature, spacing means bearing a fixed relationship to the mounting means and contacting each magnet to maintain a space between the magnets and the armature to provide a predetermined air gap therebetween, and a frame having sides disposed in planes parallel to the axis of rotation of the shaft, said frame surrounding and engaging the magnets and being adjustable to accommodate magnets of varying dimensions.

2. In an electric motor of the class described, a pair of spaced permanent magnets, a rotatable armature including a shaft and disposed between said magnets, means mounting said shaft for rotation, spacer means bearing a fixed relationship to the mounting means and contacting each magnet to space the magnets from the armature to provide a predetermined air gap therebetween, and a frame having sides disposed in planes parallel to the axis of rotation of the shaft and surrounding and engaging the magnets, said frame being adjustable to accommodate magnets of varying dimensions.

3. In an electric motor of the class described, a pair of spaced permanent magnets, a rotatable armature including a shaft and disposed between said magnets, means mounting the shaft for rotation, spacer means carried by said mounting means and contacting each magnet to space the magnets from the armature to provide a predetermined air gap therebetween, and a frame having sides arranged in planes parallel to the axis of rotation of said shaft and surrounding and engaging said magnets, the sides of said frame being adjustable in directions transversely of the axis of rotation of the shaft to accommodate magnets of varying dimensions.

4. The electric motor of claim 3, wherein means are provided on the mounting means and the frame to allow limited movement of said frame in directions transversely of the axis of the shaft and to prevent movement of the sides of said frame in directions parallel to the axis of the shaft.

5. In an electric motor of the class described, a pair of spaced permanent magnets, a rotatable armature including a shaft and disposed between said magnets, a pair of support members mounting the shaft for rotation and supporting said magnets, spacer means carried by the support members and engaging said magnets to space the latter from said armature to provide a predetermined air gap therebetween, and a frame surrounding and engaging said magnets and in engagement with said support members, said frame being adjustable to accommodate magnets of varying dimensions.

6. In an electric motor of the class described, a pair of spaced permanent magnets, a rotatable armature including a shaft and disposed between said magnets, a housing of box-like configuration enclosing said magnets and said armature, said housing having a first pair of opposed and parallel walls mounting the shaft for rotation and arranged in planes extending normal to the axis of rotation of the shaft, a second and a third pair of opposed and parallel walls of said housing engaging said magnets and being adjustable in direction transversely of said shaft for accommodating magnets of varying dimensions, and spacer means in said housing arranged to contact each magnet to space magnets from the armature to provide a predetermined air gap therebetween.

7. In an electric motor of the class described, a pair of spaced perament magnets, a rotatable armature including a shaft and disposed between said magnets, a housing of box-like configuration enclosing said magnets and said armature and having a pair of opposed and parallel walls extending in planes normal to said shaft, said walls mounting said shaft for rotation, spacer means carried by said walls for engaging said magnets and for spacing the magnets from the armature to provide a predetermined air gap therebetween, and the other walls of said housing being adjustable and movable relative to the first mentioned pair of walls of said housing in direction extending transversely of the shaft, said other walls engaging the magnets and being movable to vary the cross sectional area of the housing in a plane transversely of the shaft to accommodate magnets of varying dimensions.

8. The motor of claim 7 wherein the spacer means is formed integrally with the first mentioned pair of housing walls and extends between the magnets and the shaft.

9. The motor of claim 7 wherein the spacer means comprises an annular projecting portion formed on each of the first mentioned pair of housing walls and are concentrically disposed with respect to the shaft, and said magnets are each provided with an arcuate face engaged by said annular portion.

10. The motor of claim 7 wherein means are provided on said housing walls to prevent relative movement therebetween in a direction extending longitudinally of the shaft but provides limited movement of said other walls relative to said first pair of walls in directions extending transversely of said shaft.

11. In an electric motor of the class described, a frame of rectangular cross-section having two pairs of oppositely disposed walls and open at two sides, the walls of said frame being movable in directions extending transversely to the planes thereof to vary the cross sectional area of the frame, a pair of cover members substantially rectangular in shape covering the open sides of the frame and engaging the edges of the wall in said frame at the open sides thereof, a recessed portion formed in each of said cover members to accommodate the edges of said frame walls engaging said cover members, a shoulder formed in said recessed portions for limiting movement of the frame walls in directions reducing the cross sectional area of the frame, a rotatable armature including a shaft mounted for rotation in said cover members with the axis of rotation extending normal to the cover members, a pair of permanent magnets arranged between the armature and the walls of the frame, said magnets being engaged by the walls of said frame, and a spacer member on each cover member extending between the magnets and the shaft and engaging the magnets to maintain a predetermined air gap between said magnets and said armature.

12. The electric motor of claim 11 wherein the frame comprises a pair of L-shaped members provided with cooperating tongues and slots to provide for interlocking engagement of said members.

13. The electric motor of claim 12 wherein the longer sides of the L-shaped members are provided with apertures, and the cover members are provided with fingers for accommodation within said apertures to restrain movement of said L-shaped members relative to the cover members in directions longitudinally of the shaft.

14. In an electric motor of the class described, a rotatable armature having a shaft, means mounting said shaft for rotation, a pair of spaced permanent magnets polygonal-shaped in transverse cross sections, each of said magnets having first and second pairs of spaced and parallel side walls, said first pair of side walls of each magnet being of non-arcuate configuration and said second pair of side walls of each magnet comprising an inner arcuate pole face and an outer non-arcuate pole face, said inner arcuate pole faces of said pair of magnets disposed in coaxial relationship with said shaft, said magnets being magnetized in directions normal to the inner pole faces, a magnetic return frame surrounding and engaging the non-arcuate side walls of said first and second pair of side walls of said magnets, and spacer means engaging the inner pole faces of said magnets to maintain a predetermined air gap between said magnets and said armature.

15. In an electric motor of the class described, a rotatable armature having a shaft, a pair of opposed and spaced support members mounting said shaft for rotation about an axis perpendicular to said support members, a pair of spaced permanent magnets substantially rectangular in transverse cross section except for one concave arcuate side, said arcuate sides providing inner arcuate pole faces disposed in coaxial relationship with said shaft, the remaining sides of each of said magnets comprising non-arcuate outer pole faces, said magnets being magnetized in directions normal to the inner arcuate pole faces, a magnetic return frame having two pairs of parallel and opposed sides extending in planes parallel to said shaft and arranged between said support members, said magnetic return frame being in engagement with the non-arcuate pole faces of said magnets, and spacer means engaging the inner pole faces of said magnets to maintain a predetermined air gap between the inner pole faces of said magnets and said armature.

16. The electric motor of claim 15 wherein said spacer means are carried by said support members and comprise annular shaped members arranged coaxial with the shaft, said annular shaped members having outer surfaces disposed in concentric relationship with the inner pole faces of said magnets and in contact therewith.

17. In an electric motor of the class described, a pair of spaced elongated permanent magnets substantially rectangular in transverse cross section except for one side thereof being arcuate shaped, said magnets being magnetized in directions normal to the arcuate sides and the latter being disposed along a surface of revolution about a common center, a rotatable armature having a shaft arranged with its axis of rotation coincident with said common center, said armature being disposed in spaced concentric relationship with the inner sides of said magnets, a pair of spaced support members mounting the shaft for rotation, said support members arranged at opposed ends of said magnets and extending in planes lying transversely of the magnets, a magnetic return rectangular-shaped frame arranged between said support members and in engagement therewith, said magnetic return frame surrounding and engaging the non-arcuate sides of said magnets, and an annular spacer member carried by each support member concentric with said shaft and having an outer surface in contact with the arcuate sides of said magnets to maintain a predetermined air gap between the arcuate sides of said magnets and said armature.

18. In an electric motor of the class described, a housing of rectangular cross section including side walls and a pair of spaced end walls extending transversely of the side walls, a rotatable armature including a shaft journaled for rotation in said end walls and having its axis of rotation extending normal to the latter and parallel with said side walls, spacer means carried by said end walls and spaced from said side walls, and a pair of spaced permanent magnets disposed between said spacer means and the side walls of said housing in spaced relationship with said armature, each of said permanent magnets having an inner pole face adjacent to the armature and engaged by said spacer means to maintain a predetermined air gap between said armature and said inner pole face.

19. The electric motor of claim 18 wherein the spacer means are formed integral with the end walls and extend into the housing between said side walls and the shaft of said armature.

20. In an electric motor of the class described, a frame of rectangular cross section having spaced and parallel lateral walls with a pair of open sides in planes extending normal to said lateral walls, a rotatable armature having a shaft extending in directions perpendicular to the planes containing the open sides of said frame, a pair of spaced permanent magnets having inner pole faces disposed about said armature and outer pole faces in engagement with the lateral walls of said frame, and a pair of spaced cover members disposed in the planes of the open sides of said frame and seating the edges of said lateral walls thereon, said cover members mounting said shaft for rotation and engaging the inner pole faces of said magnets to maintain the magnets in spaced relationship with said armature to provide a predetermined air gap between the inner pole faces of said magnets and said armature.

References Cited by the Examiner

UNITED STATES PATENTS

| | | | |
|---|---|---|---|
| 2,325,915 | 8/1943 | Naul. | |
| 2,479,455 | 8/1949 | Aronoff | 310—154 |
| 2,482,875 | 9/1949 | Sawyer | 310—154 |
| 2,617,851 | 11/1952 | Bisch | 310—154 |
| 2,935,785 | 5/1960 | Stein | 310—154 |
| 2,939,024 | 5/1960 | Mabuchi. | |

FOREIGN PATENTS

| | | |
|---|---|---|
| 1,220,515 | 5/1960 | France. |
| 781,107 | 8/1957 | Great Britain. |

ORIS L. RADER, *Primary Examiner.*

MILTON O. HIRSHFIELD, *Examiner.*